March 11, 1924.

C. F. CRECELIUS

AUTOMOBILE POCKET

Filed Feb. 21, 1923

1,486,566

Inventor
C. F. Crecelius

By Mason, Fenwick & Lawrence,
Attorneys

Patented Mar. 11, 1924.

1,486,566

UNITED STATES PATENT OFFICE.

CARL F. CRECELIUS, OF FALMOUTH, KENTUCKY.

AUTOMOBILE POCKET.

Application filed February 21, 1923. Serial No. 620,545.

*To all whom it may concern:*

Be it known that CARL F. CRECELIUS, citizen of the United States, residing at Falmouth, in the county of Pendleton and State of Kentucky, has invented certain new and useful Improvements in Automobile Pockets; and I do hereby declare the following to be a full, clear, and exact description of the invention, such as will enable others skilled in the art to which it appertains to make and use the same.

This invention relates to improvements in automobile pockets, and more especially to supplementary pockets which are adapted to be attached to the doors of an automobile, so that there will be a convenient place to carry the usual tools and other necessities.

The object of the invention is to provide a suitable automobile pocket which will be provided with a resilient clamping and supporting member which is adapted to engage the upper portion of an automobile door and which is further adapted to support a bag or pocket in which the tools or other necessities may be carried.

A further object of the invention is to provide a suitable detachable automobile pocket which may be clamped over the top of an automobile door for holding any desired article, and which will be so constructed that it may be removed and another pocket positioned without delay.

A still further object of the invention is to provide a suitable detachable automobile pocket which will be highly efficient in use and quite inexpensive to manufacture.

Other objects will appear as the description proceeds.

In the accompanying drawings, which form a part of my application,

Figure 1:
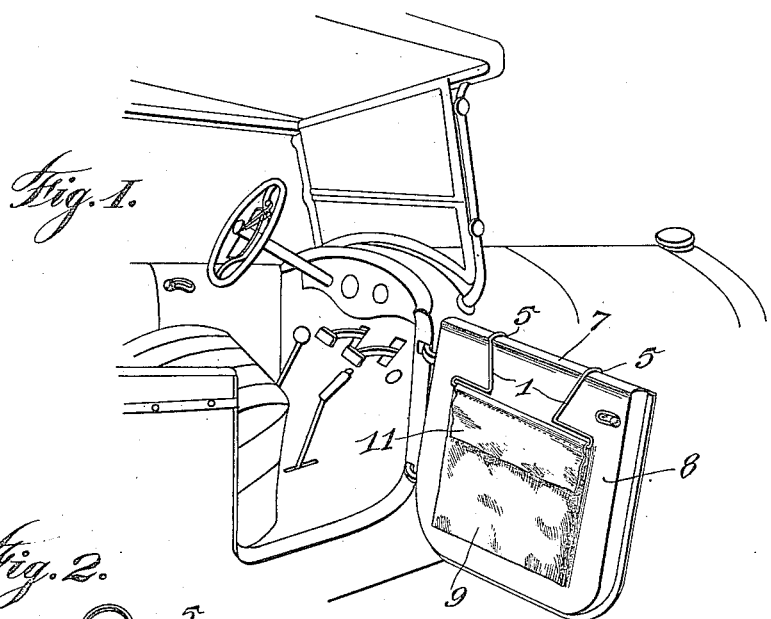
Fig. 1 is a perspective view of my improved automobile pocket attached to a door of an automobile.
Figure 2:
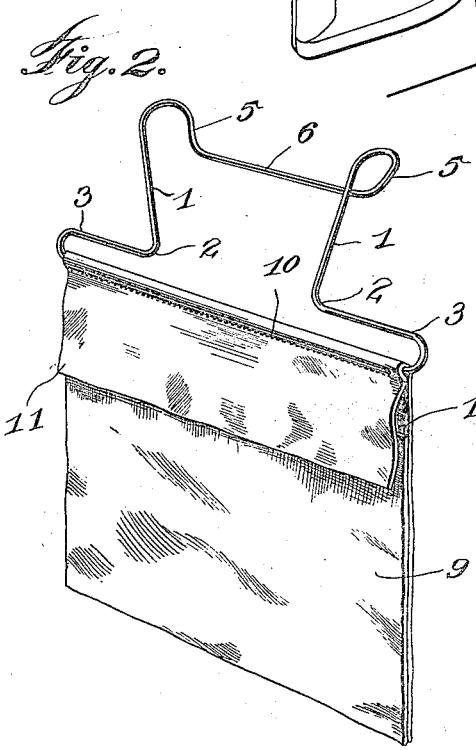
Fig. 2 is a perspective view of the automobile pocket.
Figure 3:
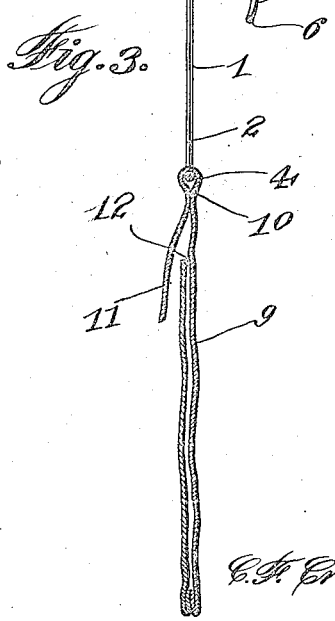
Fig. 3 is a vertical sectional view of the same.

Like characteristics of reference are used throughout the following specification and the accompanying drawings to designate corresponding points.

A suitable resilient clamping support is provided with spaced upwardly and outwardly extending diverging members 1, which are bent laterally as at 2 to form the shoulders 3, which are bent inwardly and have their opposite ends connected as at 4, to form a supporting bar or member.

The upwardly extending members 1 are bent rearwardly and downwardly as at 5 and are connected by the portion 6. The rearwardly and downwardly turned portion 5 is adapted to be positioned over the upper surface 7 of an automobile door 8 in such a manner that the upwardly extending members 1, are positioned on the inside of the said door while the cross member 6 is positioned on the outside of the same.

A suitable bag or container 9 is secured to the supporting bar in any desired manner as by the stitches 10 and is provided with a flap or closure 11 for the opening 12 at the top of the bag.

From the foregoing description it will be apparent that since the several portions of the clamping support are formed of a resilient material, preferably wire, the connecting bar 6 will have the tendency to firmly clamp the support in position on the upper portion 7 of the door 8.

This supplemental pocket is more especially adapted for use where there are no pockets provided in the automobile door, so that the tools and other necessities may be placed therein so that they will be convenient and handy when needed.

It will be understood that this supplemental pocket may be made for a very small cost, so that when one is partially worn out or completely worn out, it may be interchanged with a new one, whereas, when the usual pocket in an automobile door is broken or worn out, the same is rendered of little or no value. The spaced members 1 and 5 extend at a slight angle to each other so that there will be a resilient clamping action between the same when in position on the automobile door.

Many minor changes in detail of description may be resorted to without departure from the spirit of the invention.

Having thus described my invention, what

I claim as new and desire to secure by Letters Patent of the United States is:

A bag supporting member comprising a horizontal bar having its ends bent inwardly and extending upwardly from the inner ends of the bent-in members and bent outwardly and downwardly from the plane of the horizontal bar and bent-in members to form a hook, the hook members being connected by a bar forming a continuation of the hook terminals.

In testimony whereof I affix my signature.

CARL F. CRECELIUS.